United States Patent [19]

Blanchard

[11] Patent Number: 5,213,549
[45] Date of Patent: May 25, 1993

[54] DERAILLEURS FOR MULTI-SPEED BICYCLES

[76] Inventor: Pierre Blanchard, 645 Isabelle Street, Acton Vale, Canada, J0H 1A0

[21] Appl. No.: 733,624

[22] Filed: Jul. 22, 1991

[51] Int. Cl.$^5$ .................................................. F16H 61/00
[52] U.S. Cl. ......................................... 474/81; 474/82
[58] Field of Search ....................... 474/78, 80, 81, 79, 474/82

[56] References Cited

U.S. PATENT DOCUMENTS

| | | | |
|---|---|---|---|
| 2,590,975 | 4/1952 | Juy | 474/80 |
| 3,785,219 | 1/1974 | Anthamatten | 474/81 |
| 3,847,028 | 11/1974 | Bergles | 474/80 |
| 4,023,424 | 5/1977 | Ryan et al. | 474/80 |
| 4,061,048 | 12/1977 | Huret et al. | 474/82 |
| 4,231,264 | 11/1980 | Bergles | 474/80 |
| 4,305,711 | 8/1981 | Lannoch | 474/82 |
| 4,331,433 | 5/1982 | Marius | 474/79 |
| 4,349,342 | 9/1982 | Schwerdhofer | 474/80 |
| 4,439,171 | 3/1984 | Bergles | 474/80 |
| 4,842,568 | 6/1989 | Marchigiano | 474/80 |

*Primary Examiner*—Ramon S. Britts
*Assistant Examiner*—Roger J. Schoeppel
*Attorney, Agent, or Firm*—Pierre Lespérance; Francois Martineau

[57] ABSTRACT

The derailleur includes a relatively long, torsion-resisting bar extending below and generally along one of the two rear wheel-supporting bicycle frame members. The front end of said bar is held by a fastener secured to the bicycle frame adjacent the housing of the pedalling axle. The holder prevents the bar from rotating about its long axis. The rear end of the bar is movable transversely of the frame member by a remote control actuator. The rear end of said bar carries a drive chain idle transfer and a chain take-up device which serve to transfer the drive chain from one to another rear drive sprocket, while taking up the slack in the chain. The chain take-up device preferably comprises an elongated member supported by and extending alongside the bar, movable longitudinally along said bar and carrying at its rear end a drive chain engaging idle sprocket. The elongated member is biased rearwardly. The rear end of the bar carries a hook selectively engaging anyone of several positioning recesses made in a plate fixed to the frame member, whereby the bar can be positioned transversely of the frame member to maintain the drive chain transfer member in alignment with the selected drive sprocket socket. The invention is also directed to two types of derailleurs for the front crank sprockets and to combined front and rear derailleurs.

29 Claims, 14 Drawing Sheets

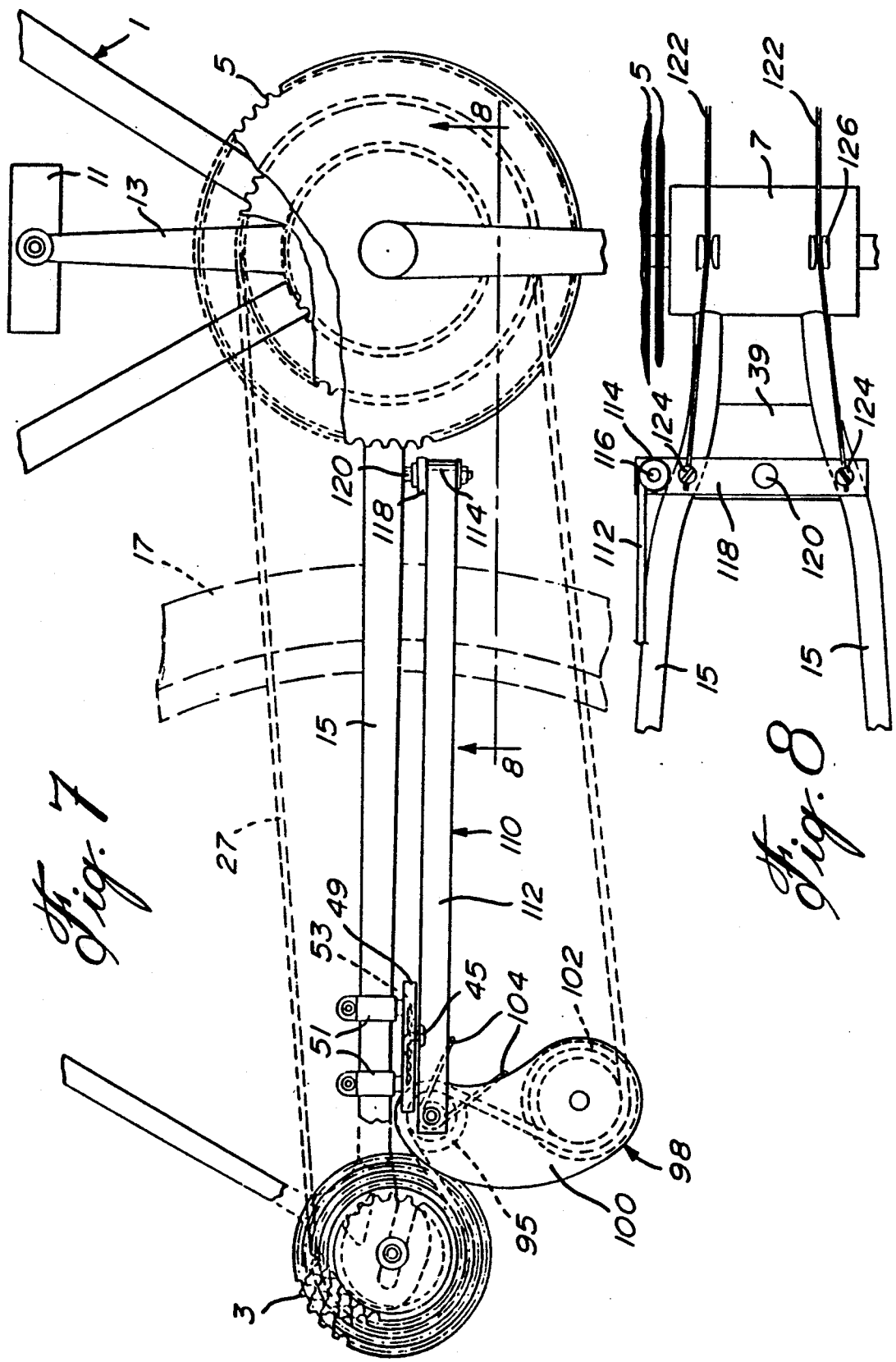

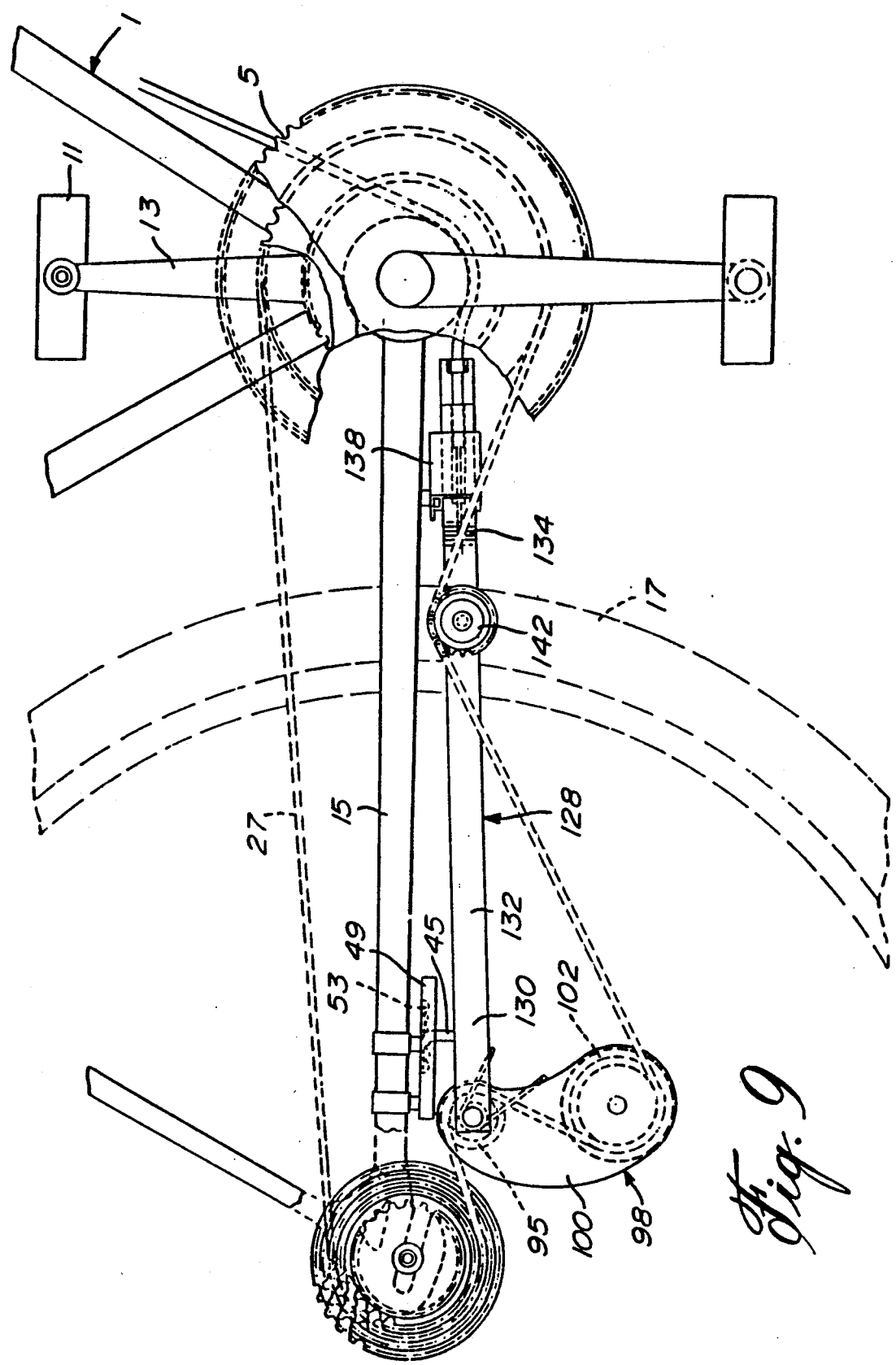

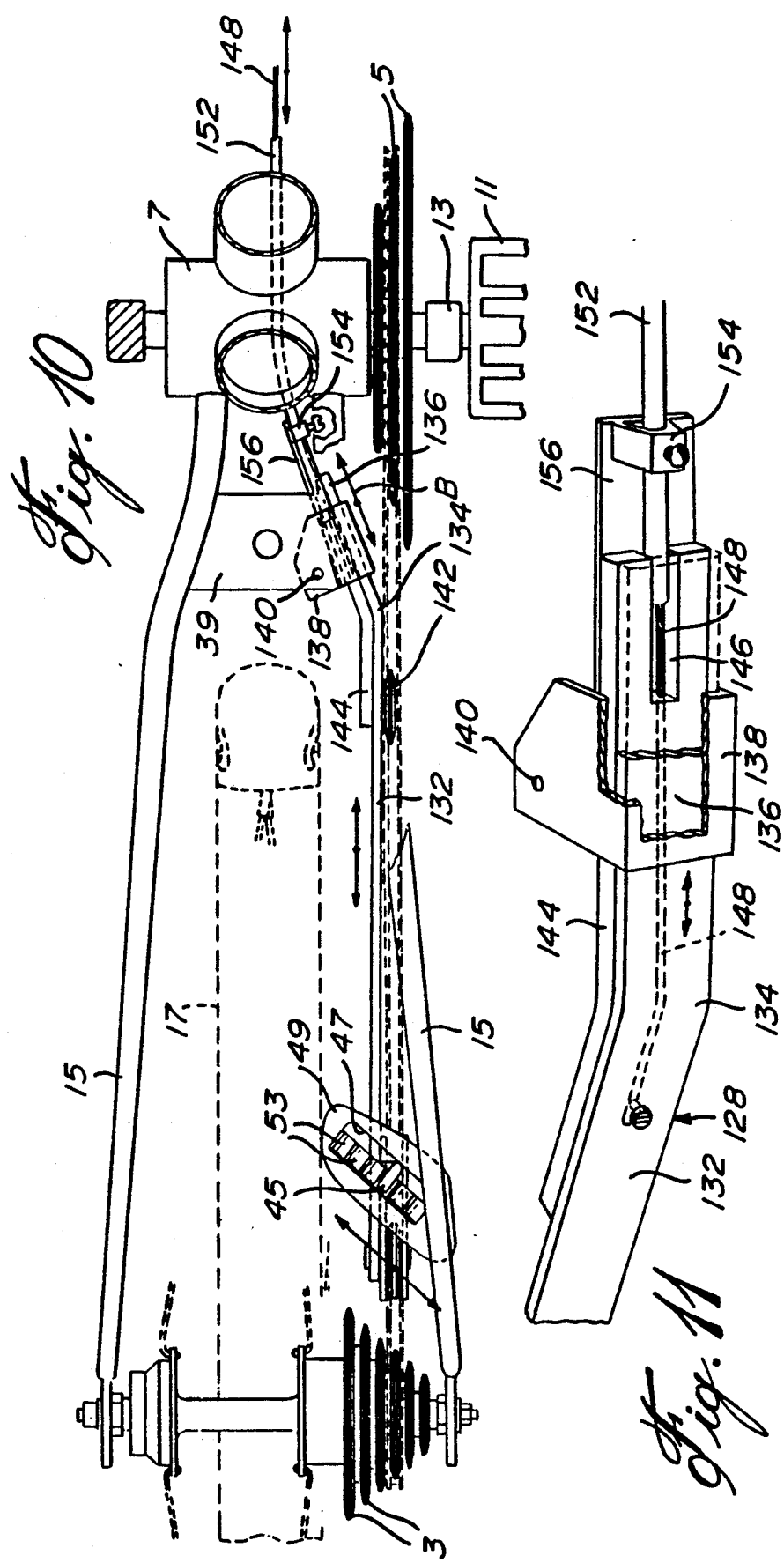

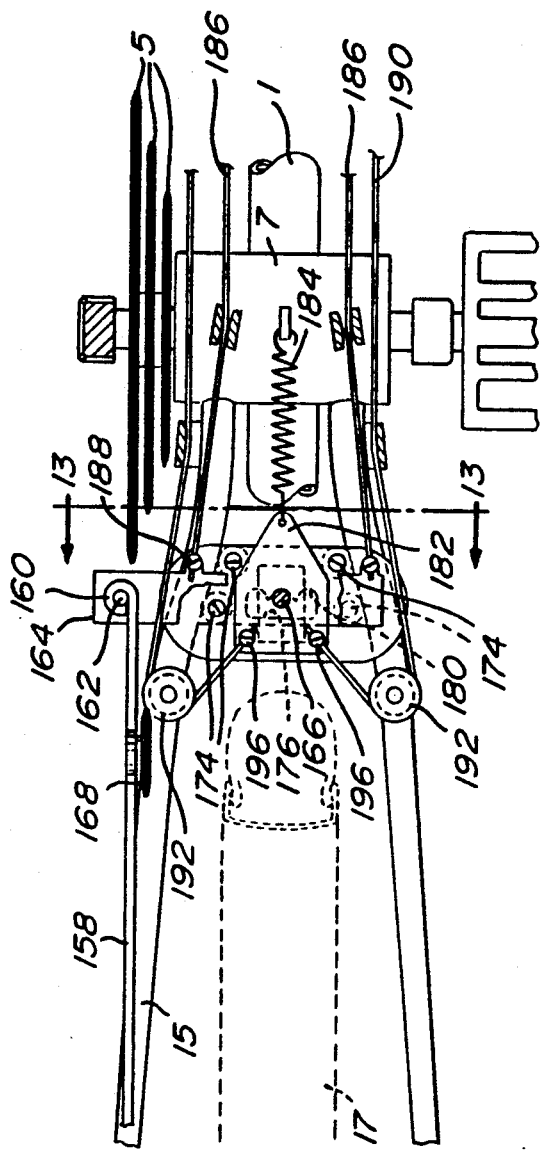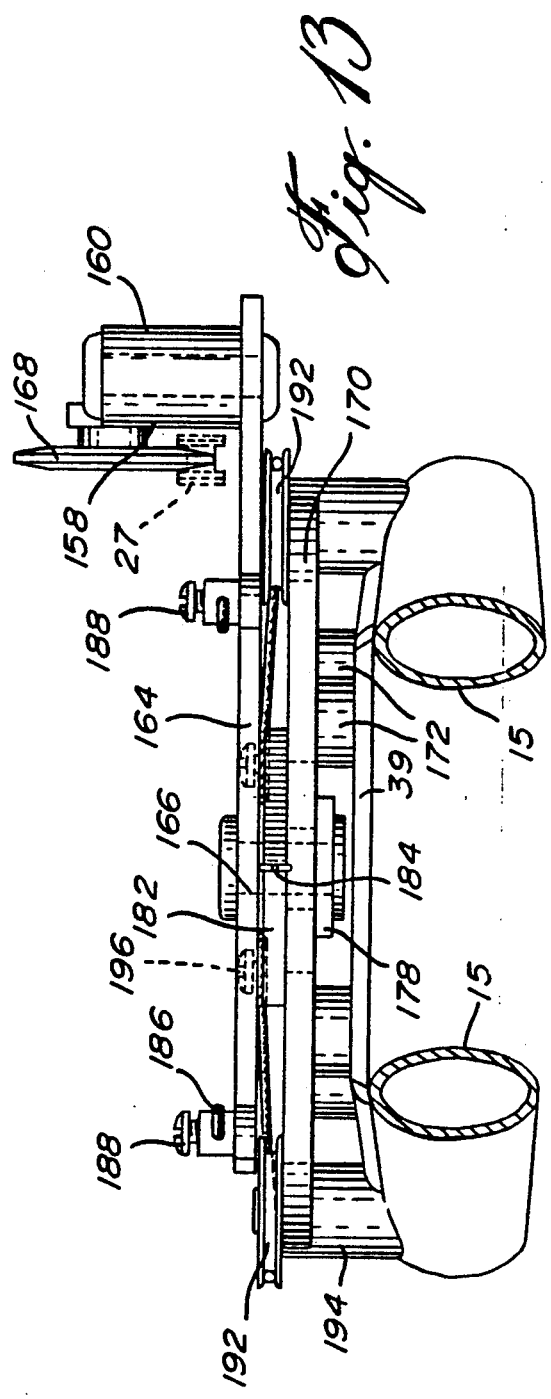

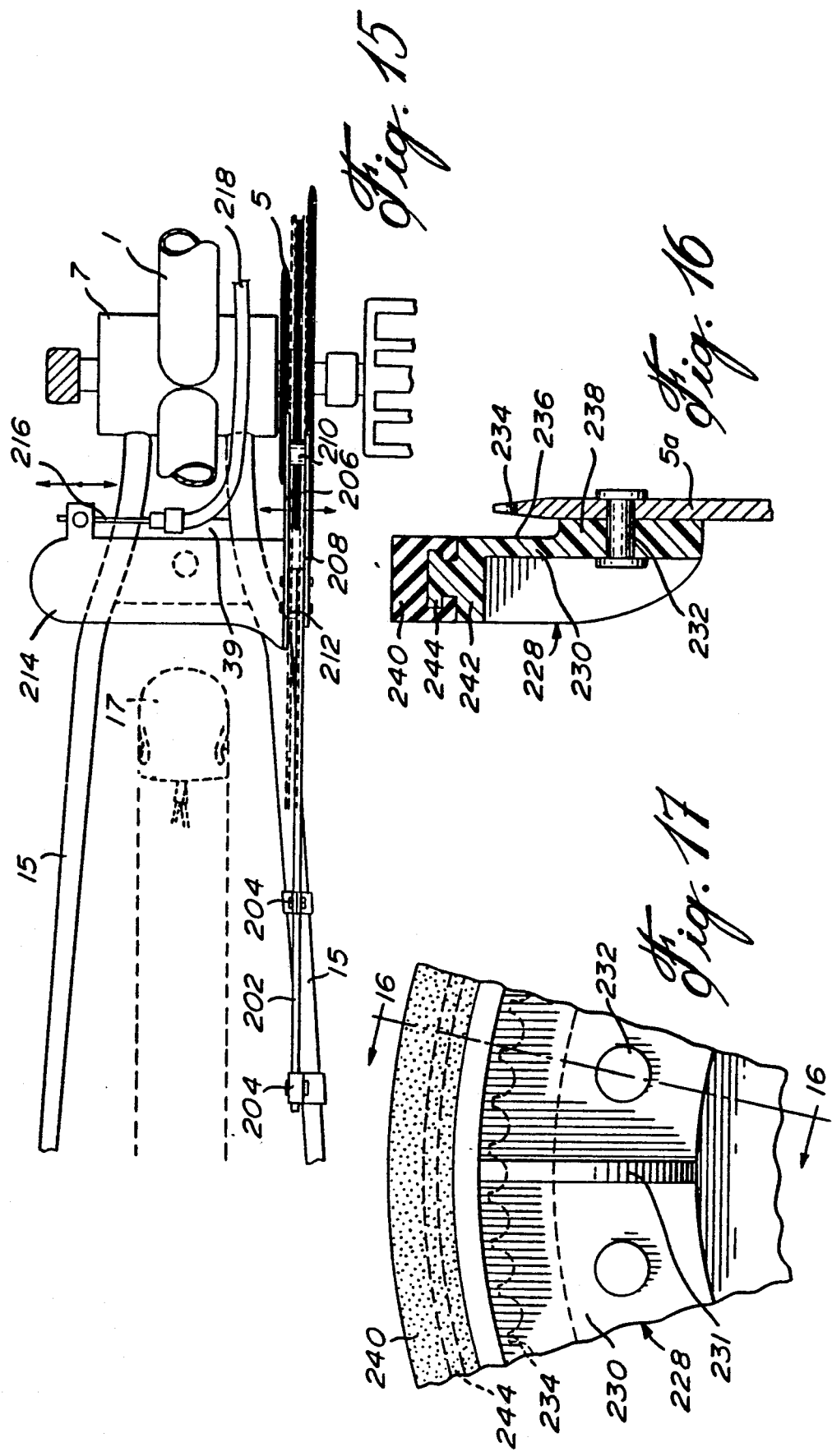

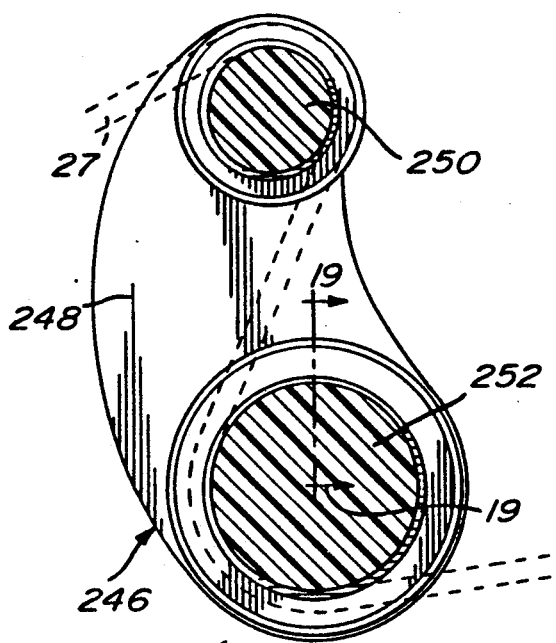
Fig. 18
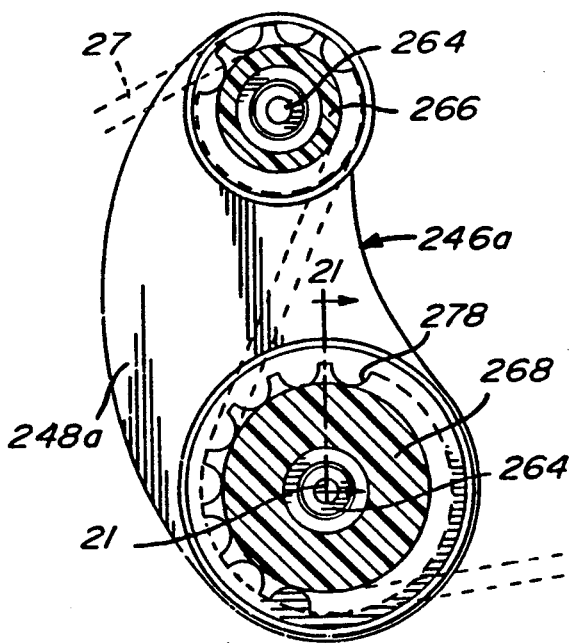
Fig. 20
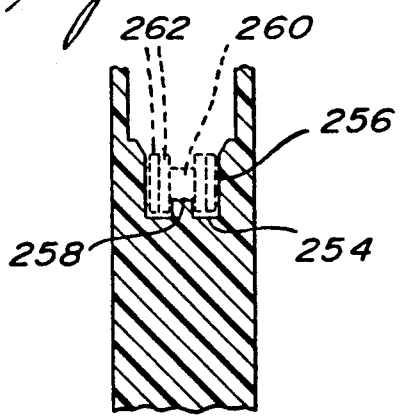
Fig. 19
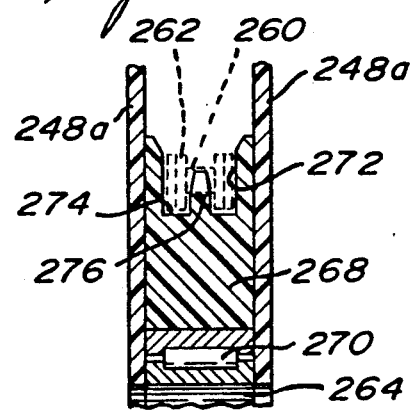
Fig. 21
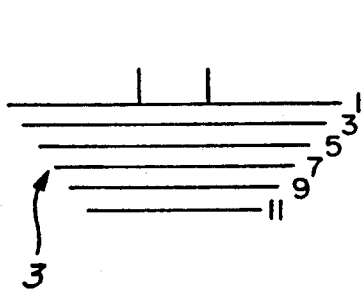
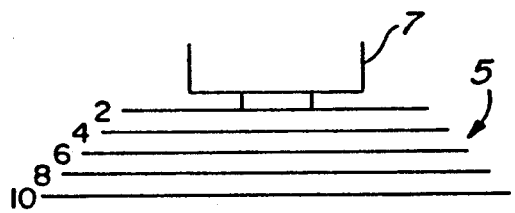
Fig. 22

DERAILLEURS FOR MULTI-SPEED BICYCLES

FIELD OF THE INVENTION

The present invention relates to derailleurs for multi-speed bicycles for the front as well as the rear drive chain-engaging sprockets.

BACKGROUND OF THE INVENTION

Known derailleur systems for multi-speed bicycles include a chain transfer sprocket and a chain take-up sprocket mounted at the end of a parallelogram system, which maintains the two sprockets parallel to themselves when transversely shifted from different positions in alignment with the respective rear drive sprockets. Such a parallelogram arrangement is made of several parts and, consequently, is expensive to make with the required precision. Moreover, such parallelogram devices have to extend on the outside of the bicycle frame and are liable to be hit and broken, especially when used on a mountain bike. The same holds true for the known front derailleur systems used to transfer the chain from one front sprocket to the other. Also, known front derailleurs very often come out of adjustment and fail to properly transfer the drive chain from one front sprocket to the other, since the chain contacting transfer plates of the front derailleur needs to be transversely shifted past the plane of the sprocket onto which it is intended to transfer the drive chain. It is appreciated that this transfer movement has to be carefully adjusted, so as to prevent chain transferring to an unintended sprocket.

Front and back derailleurs are separate entities and are therefore time-consuming to install.

U.S. Pat. No. 4,023,424, dated May 17, 1977, entitled: INBOARD DERAILLEUR FOR MULTI-SPEED BICYCLES—inventors: John W. Ryan and James D. Moore, describes a rear derailleur in which the chain transfer and take-up sprockets are mounted at the end of a rod which is guided for transverse movement by passing through inclined slots made in a pair of vertically-spaced plates secured to the wheel-supporting frame member. Thus, the downward leg of the rod is maintained vertical to maintain the two sprockets in a vertical plane. Substantial force is required to be applied to the longitudinal rod, in order to effect chain transfer. This force would exceed the normal capacity of the remotely-actuated flexible cable actuators.

OBJECTS OF THE INVENTION

The general object of the invention is to provide derailleurs for multiple-speed bicycles which overcome the deficiencies and disadvantages of prior known derailleurs, in that they are of simpler and less expensive construction; are less liable to be hit and broken, since they have greater ground clearance and are mounted inboard of the bicycle frame.

Another object of the present invention resides in the provision of a combined front and back derailleur for bicycles having a plurality of front as well as back sprockets.

Another object of the invention is to provide a front derailleur having a more positive chain transferring action and less liable to malfunction than known front derailleurs.

Another object of the present invention is to provide improved chain transfer and chain take-up devices.

Further objects of the invention will become apparent from the following detailed description and annexed drawings:

BRIEF DESCRIPTION OF THE DRAWINGS

FIG. 7 is a side elevation of a bicycle frame fitted with a third embodiment of the rear derailleur;

FIG. 8 is a bottom plan view taken along line 8—8 of FIG. 7;

FIG. 9 is a side elevation of part of a bicycle fitted with a fourth embodiment of a derailleur, this derailleur being a combined front and back derailleur;

FIG. 10 is a top plan section of FIG. 9;

FIG. 11 is a perspective view of part of the derailleur of FIG. 9;

FIG. 12 is a bottom plan view of part of a bicycle showing a part of the fifth embodiment of the derailleur, this derailleur being a combined front-and-back derailleur;

FIG. 13 is a cross-section taken along line 13—13 of FIG. 12, the parts being shown in upside-down position;

FIG. 15 is a top plan section taken along line 15—15 of FIG. 14;

FIG. 16 is a partial cross-section of the largest diameter front sprocket and guard therefor, said section being taken along line 16—16 of FIG. 17;

FIG. 17 is a partial side elevation of FIG. 16;

FIG. 18 shows an embodiment of the chain transfer and take-up device;

FIG. 19 is a partial cross-section taken along line 19—19 of FIG. 18;

FIG. 20 is a section of a second embodiment of a transfer and take-up device;

FIG. 21 is a partial cross-section taken along line 21—21 of FIG. 20;

FIG. 22 is a schematic diagram of the front and back sprockets of a multi-speed bicycle intended to explain how gear changing is effected when using a combined rear and front derailleur.

DETAILED DESCRIPTION OF THE PREFERRED EMBODIMENTS

Figure 1:
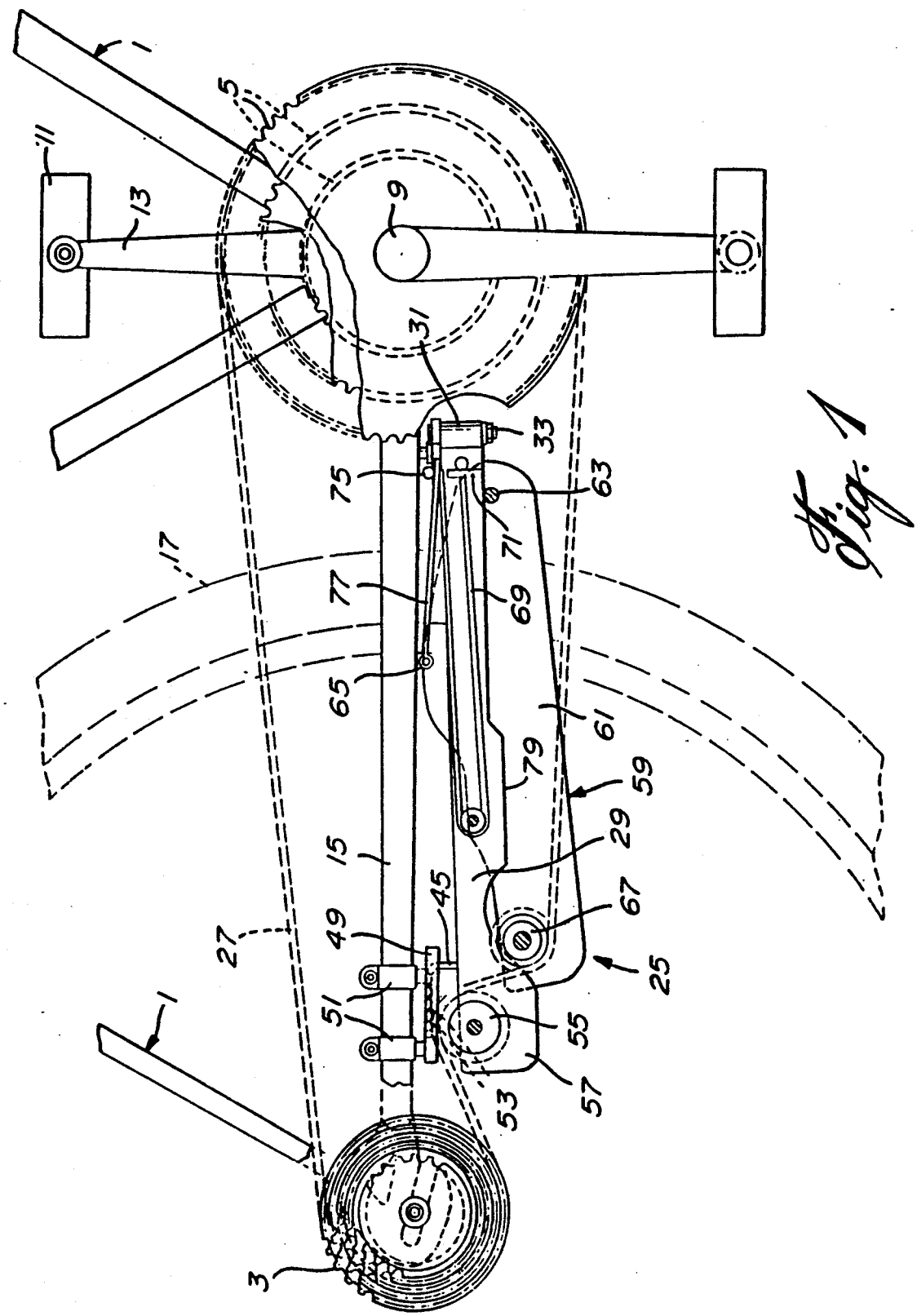
FIG. 1 is a side elevation of part of a multi-speed bicycle and of a first model of a rear derailleur in accordance with the invention, shown with the chain take-up device in foremost position.
Figure 2:
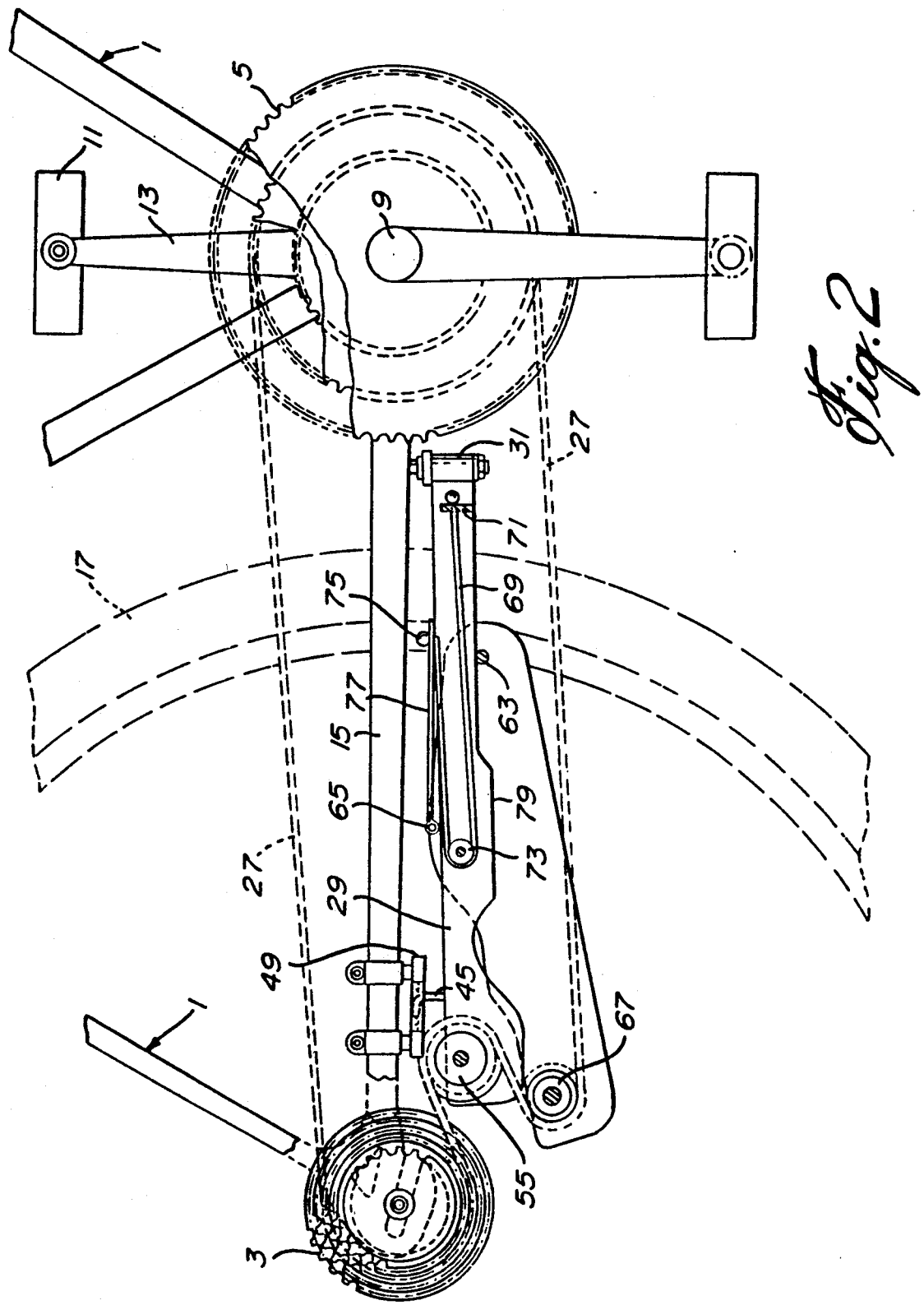
FIG. 2 is a view similar to that of FIG. 1 and showing the chain take-up device in intermediate position.
Figure 4:
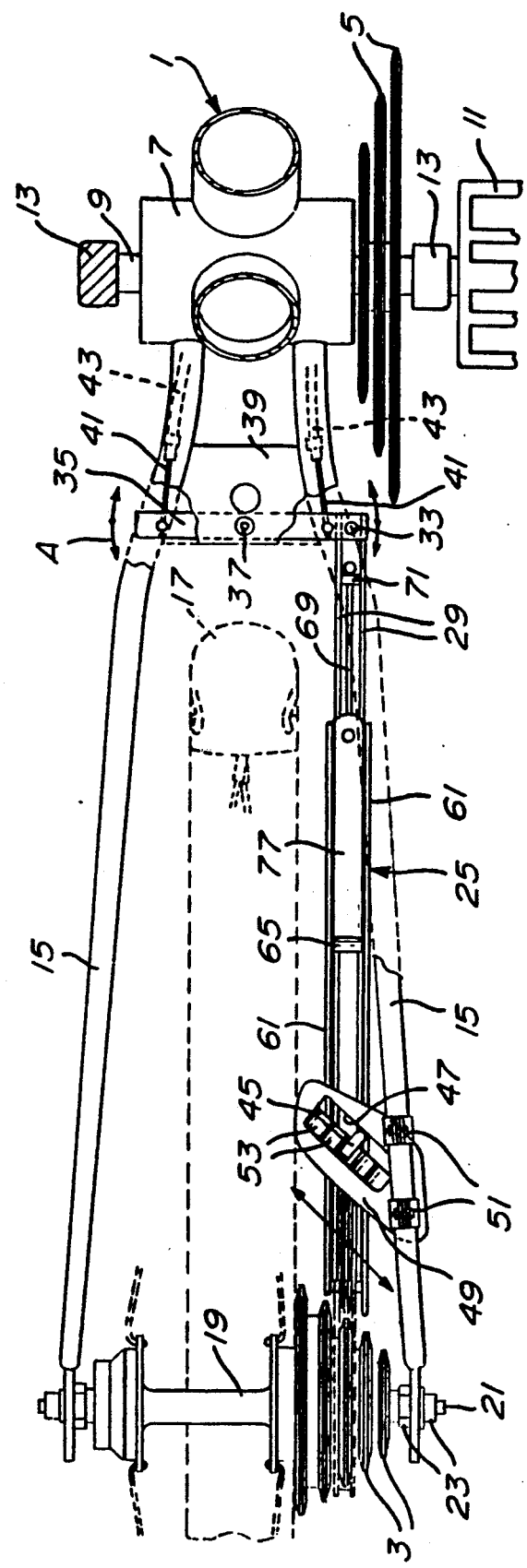
FIG. 4 is a top plan section of part of the bicycle fitted with the derailleur of FIG. 1.

Referring to FIGS. 1 and 4, there is shown part of a bicycle frame 1, of a multi-speed bicycle, having a plurality of back drive sprockets 3 and front sprockets 5. Bicycle frame 1 includes a housing 7 for supporting the pedalling axle 9 which not only the pedals 11 are attached through the cranks 13, but also the front drive sprockets, the largest diameter drive sprocket 5 being away from housing 7. Bicycle frame 1 further includes rear wheel-supporting members 15 extending from housing 7 rearwardly thereof on each side of the rear bicycle wheel 17. The latter includes a hub 19 rotatably mounted on a bolt or shaft 21 fixed to the rear ends of the two frame members 15 by nuts 23.

FIGS. 1 to 4 show a first embodiment of a rear derailleur, generally indicated at 25, and which serves to transfer driving chain 27 onto any selected one of the back drive sprockets 3, the largest diameter sprocket being closest to the rear wheel 17.

Derailleur 25 includes a bar 29 which is resistant to torsion and extends along and below the frame member 14 on the side of the back sprockets 3. The front end of the bar 29 forms a sleeve 31 pivoted on a downwardly-extending pivot pin 33 fixed to the outer end of a transversely-extending lever 35, which is in turn pivoted intermediate its ends about pivot 37 to a frame plate 39 extending between and secured to the two frame members 15 adjacent pedalling axle housing 7 at the back of the same. Lever 35 can be pivoted in either direction of rotation, as shown by arrows A—FIG. 4, by means of removely-actuated conventional flexible cables 41 attached to both ends of lever 35, with their respective sheaths 43 fixed to the bicycle frame 1, in conventional manner. Cables 41 are remotely controlled by one or more levers mounted on a part of the bicycle accessible to the rider. Thus, rotation of the transverse lever 35 causes forward and backward movement of the bar 29.

The rear end of bar 29 rigidly carries an upstanding inverted L-shape hook 45. This hook slidably extends through a slot 47 made in a positioning plate 49 which is fixed to the bicycle frame member 15 adjacent the back sprockets and extend normally horizontally spacedly underneath said frame member 15, the plate 49 being rigidly secured by brackets 51 fixed to frame member 15. The top face of positioning plate 49 is provided with a series of positioning recesses 53 extending side by side along one edge of slot 47 and normal to said slot. The horizontal top part of the hook 45 overlies the plate 49 and thus serves to suspend the rear end of bar 29. Also, this hook 45 selectively engages any one of the recesses 53 to releasably maintain a chain transfer sprocket 55, which is pivotally carried by the rear end 57 of bar 29, in alignment with a selected one of the back sprockets 3.

The drive sprockets 3 generally define a conical envelope and slot 47 is generally parallel to a generatrix of said envelope, as clearly shown in FIG. 4. It is clear that rearward movement of bar 29 causes hook 45 to move laterally outwardly of the bicycle in the direction towards the smallest diameter sprocket 3 and parallel to the generatrix of the above-mentioned envelope. Forward movement of the bar 29 causes laterally-inward shifting of the rear end 57 of bar 29. In any position, the hook 45 engages a selected recess 53 whereby the chain transfer sprocket or wheel 55 will be positively positioned in alignment with the selected drive sprocket 3. Since bar 29 is torsion resistant and the arrangement of the fastener comprising sleeve 31, pivot pin 33, transfer lever 35 and its pivot 37 does not permit rotation of bar 29 about its longitudinal axis, and since this bar is relatively long, the transfer wheel 55 will be positively maintained in all of its selected transfer positions in substantially the same plane as the selected sprocket 3. Also, due to the inclination of the slot 47, the chain transfer wheel 55 is maintained at a minimum distance from the selected sprocket 3 in all positions for a more efficient chain transfer from one sprocket to the other. The use of the transverse lever 35 for effecting backward and frontward movement of bar 29 results in a friction-free system, whereby a minimum force has to be applied by the actuator cables 41.

Derailleur 25 further includes an improved drive chain take-up device, generally indicated at 59, and comprising a pair of elongaged plates 61 extending longitudinally of the bar 59 on each side thereof and maintained parallel to each other and as a unit by means of first and second spacers 63 and 65 which rigidly interconnect the two plates 61. The first spacer 63 extends transversely of the two plates at the front ends thereof and below the bar 29. The second spacer 35 extends across the two plates 61 intermediate the ends thereof and above the bar 29. The rear ends of the two elongated plates 61 carry therebetween a chain take-up sprocket or pulley 67. An elastic cord 69 is attached at one end to an anchor plate 71 fixed to bar 29 at the front end thereof, that is adjacent sleeve 31. Elastic cord 69 extends rearwardly and the forwardly, being trained around a return pulley 73 carried by bar 29 intermediate the ends thereof. The other end of elastic cord 69 is attached at 75 to the free end of a bar part or finger 77, which is pivoted at its rear end to the second spacer 65. Finger 77 extends forwardly from spacer 65.

The lower edge of bar 29 forms, intermediate the ends of said bar, a downwardly-extending boss 79. The assembly of the two elongated plates 61 are constantly biased forwardly under the action of the elastic cord 69.

In FIG. 1, the drive chain 27 is seen trained on the largest diameter sprocket 3 and the take-up device 59 is in its forward limit position, with the chain 27 maintained tight by the cord 69.

It is seen that the rear end of the plates 61 and of the take-up pulley 67 are raised. In the intermediate position shown in FIG. 2 and in the corresponding position of FIG. 4, the take-up pulley 67 is lowered with the spacers 63 and 65 contacting the top and lower edges respectively of bar 29. This is the lowermost position of the take-up pulley 67. The latter has moved rearwardly of the transfer pulley 55 and has cleared the same.

Figure 3:
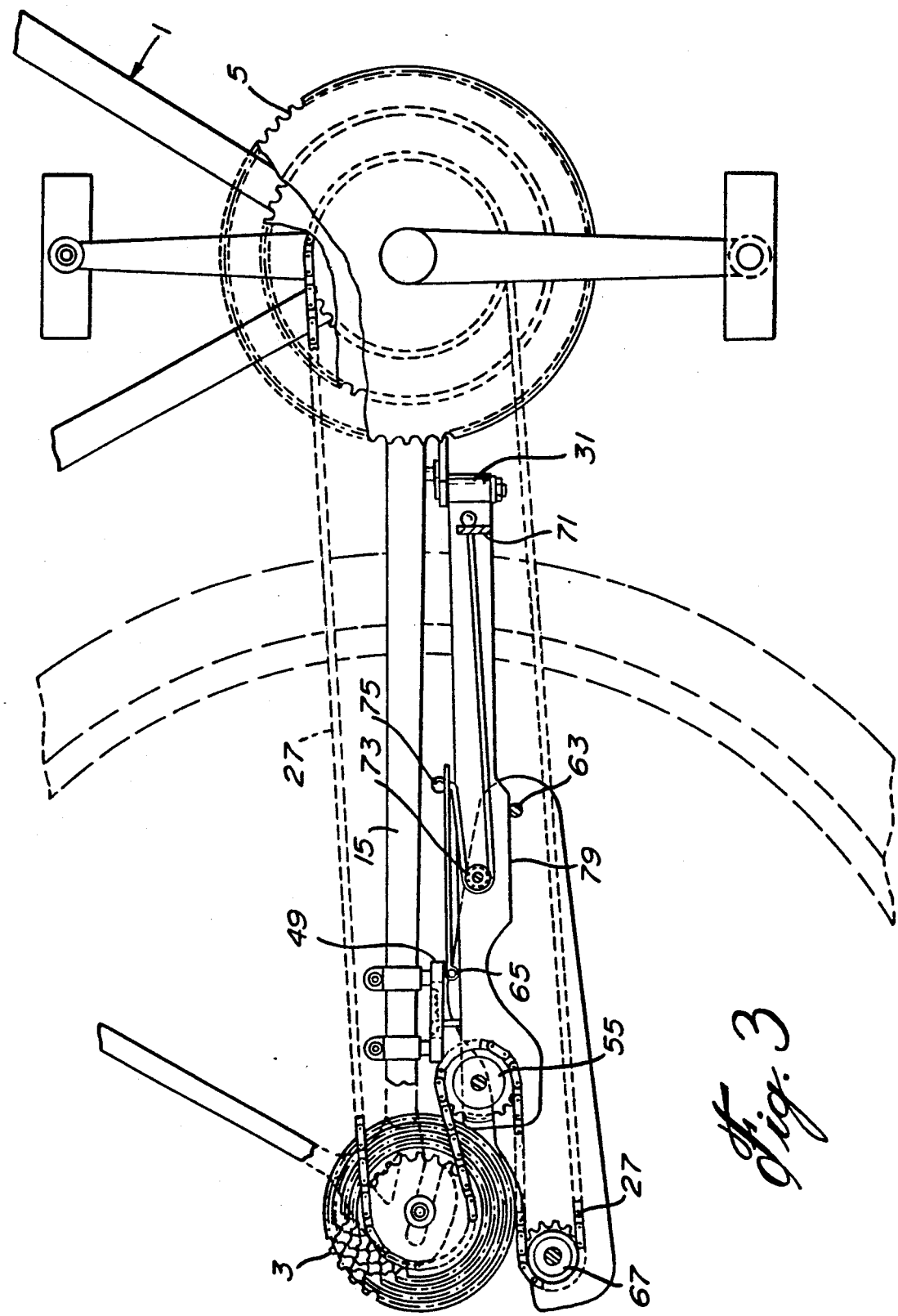
FIG. 3 is a view similar to that of FIG. 1 and showing the chain take-up device in rearmost position.

In the rearmost position of the take-up device shown in FIG. 3, with the drive chain trained on the smallest diameter sprocket 3, the take-up pulley 67 has again raised to provide maximum ground clearance. The return pulley 73 allows to use a long enough elastic cord 69, so as to exert a forward bias on the take-up device 59, despite the relatively-long stroke of the same.

Figure 5:
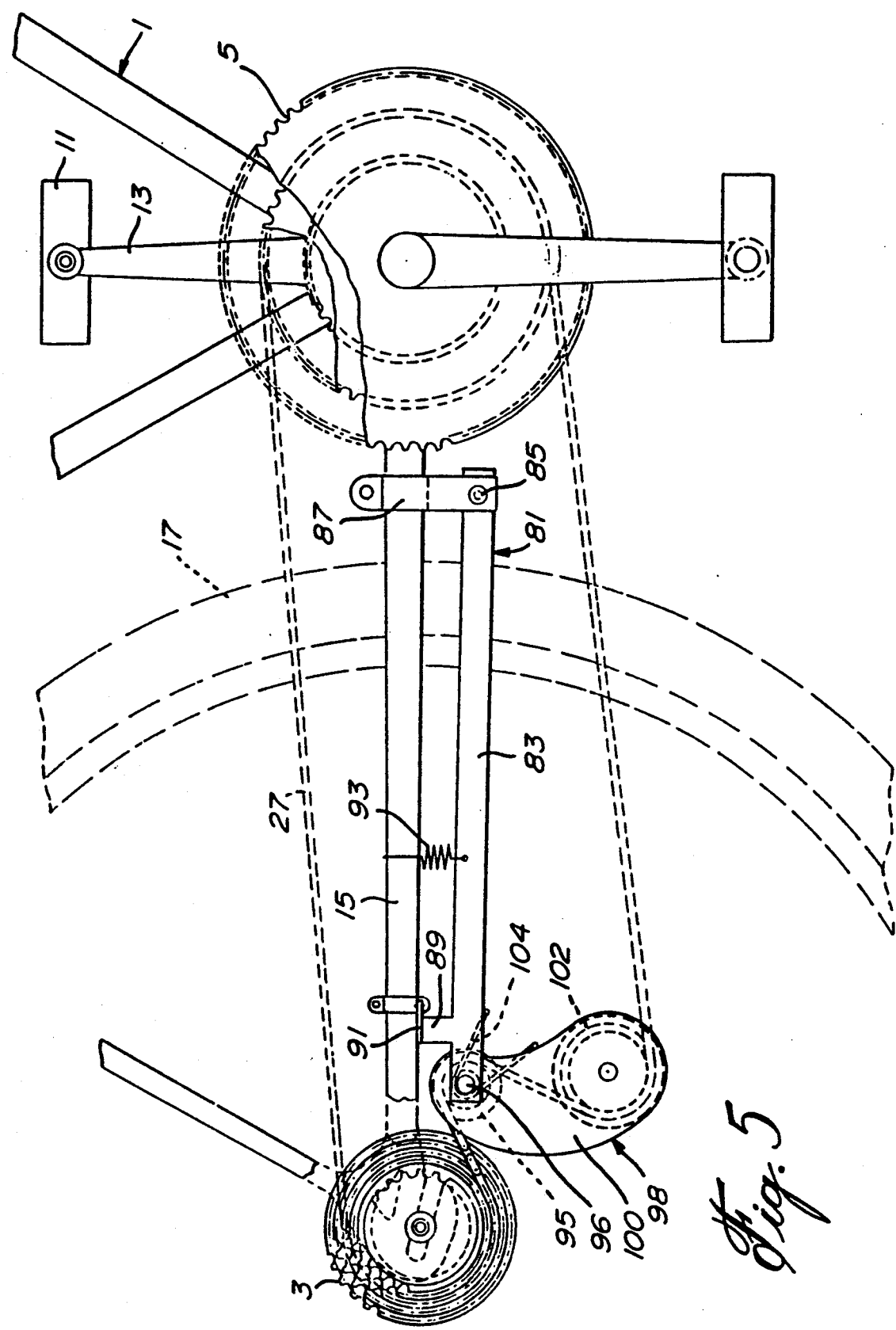
FIG. 5 is a side elevation of part of the bicycle, with a second embodiment of the rear derailleur.

Referring to FIG. 5, a second rear derailleur 81 is shown, which comprises a torsion-resistant bar 83 extending along and below the wheel-supporting frame member 15 and being pivoted for up-and-down movement at its front end at pivot 85 of a bracket 87, which is rigidly secured to the frame member 15 rearwardly of and adjacent the front sprockets 5. Bracket 87 maintains bar 83 against rotation about its longitudinal axis. Bar 83 has an upward extension 89 near its rear end, carrying a horizontally-extending abutment plate 91 slidably held against the underside of frame member 15 under the biasing action of a tension spring 93 attached to bar 83 and frame member 15.

A transfer pulley 95 is rotatably mounted about a transverse shaft 96 at the rear end of bar 83. The take-up device 98 is of conventional construction, including a pair of levers 100 pivoted at their upper ends on shaft 96 and carrying at their lower ends a take-up pulley 102. A coil spring 104, wound around shaft 96, bearing against the underside of bar 83 and the edge of levers 100, urges these levers rearwardly so as to cause take-up pulley 102 to take up the slack in the drive chain 27.

Figure 6:
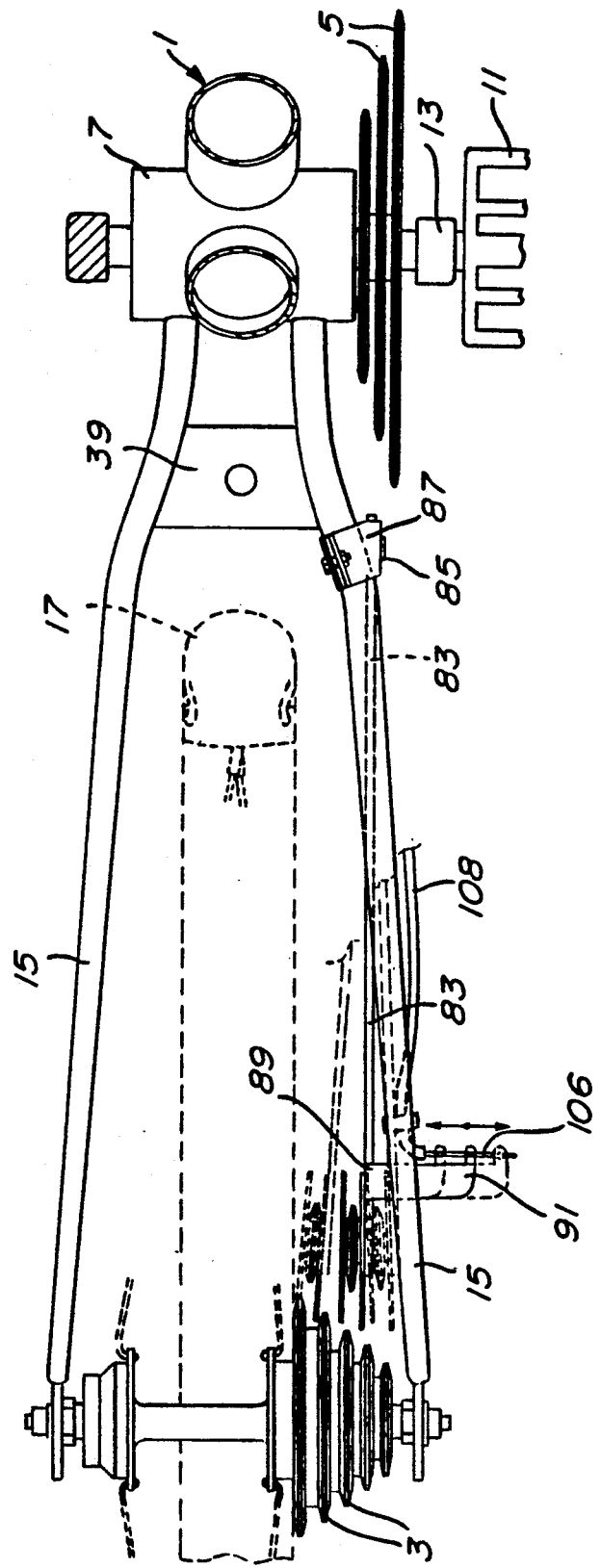
FIG. 6 is a top plan section of the bicycle fitted with the derailleur of FIG. 5.

Bar 83 is flexible and resilient, so that its rear end can be transversely shifted under the action of a flexible cable 106 (see FIG. 6) attached to the end of abutment plate 91. The sheath 108 of cable 106 is attached to the frame member 15. Cable 106 is remotely controlled by the bicycle rider, in conventional manner. Preferably, cable 106 acts in a pulling mode and movement of the bar 83 in the opposite direction is obtained due to the resiliency of the bar 83. In this embodiment, transfer pulley 95 describes a small arc between its two limit transfer positions. Thus, the variation of the angularity of the transfer pulley 95, when seen in top plan view, between its two limit positions in alignment with the two outermost sprockets, is insufficient to cause any trouble in chain transfer, due to the length of the bar 83.

The rear derailleur 110, shown in FIGS. 7 and 8, has a transfer mechanism, similar to that of FIG. 1, and a chain take-up mechanism, as in FIG. 5. Derailleur 110 includes a torsion-resistant bar 112 forming a sleeve 114 at its front end, which surrounds pivot pin 116 downwardly protruding from one end of a transverse lever 118 pivoted intermediate its ends underneath the frame plate 39 at 120. Rotation of lever 118 in either direction causes forward and rearward movement of bar 112. Lever 118 is rotated one way or the other by a selected one of the two flexible pull-cables 122 fixed to lever 118 by screws 124. Cables 122 are slidably guided between ears 126 fixed to the underside of the pedal axle housing 7. The rear end of bar 112 is provided with an L-shaped hook 45 engaging a transverse slot 47 of a positioning plate 49 fixed under the frame member 15 by brackets 51. Plate 49 has positioning recesses 53. This bar suspending and positioning arrangement is as the first embodiment.

The transfer pulley 95 is directly pivotally mounted at the rear end of the bar 112 and the chain take-up device includes the levers 100, the take-up pulley 102 and the coil spring 104, as in the embodiment of FIG. 5. As in the latter embodiment, forward and rearward movement of the bar 112 causes lateral transferring movement of the transfer wheel 95 from one sprocket to another.

The embodiment shown in FIGS. 9 to 11 shows a combined front and back derailleur, wherein a bar 128 extends along and under the bicycle frame member 15, as in the previous embodiment. The rear end 130 of said bar 128 carries, as in the embodiment of FIG. 7, the chain transfer wheel 95 and the chain take-up device 98. The rear end 130 is suspended by L-shaped hook 45 from the positioning plate 49, which has on top thereof positioning recesses 53. Therefore, as in the embodiment of FIG. 7, forward and backward movement of the bar 128 will cause transverse transfer movement of the transfer wheel 95 to move the drive chain 27 from one sprocket 3 to another.

Bar 128 has a straight rear portion 132 joined by a bend 134 to a straight front portion 136, which is inwardly inclined with respect to rear portion 132 at bend 134. Front portion 136 is slidable rearwardly and forwardly, but at an angle with respect to frame member 15 within a bracket 138, which is pivoted at 140 to a part of the bicycle frame, for instance to frame plate 39.

A front drive chain transfer wheel or sprocket 142 is mounted on the bar portion 132 just rearwardly of bend 134. This transfer sprocket 138 is used to transfer the drive chain 27 from one front sprocket 5 to another. Front transfer sprocket 138 engages the underside of the lower strand of the drive chain 27. From this, it is clear that to change a front gear, pedalling action must be reversed with respect to the pedalling action for advancing the bicycle, since chain transfer must be effected on the chain strand moving towards the sprocket.

It is obvious that the portion of bar 128, adjacent the bend 134, effects not only a longitudinal movement but also a transverse movement sufficient to transfer the chain from the largest diameter front sprocket 5 to the smallest diameter front sprocket.

It should also be appreciated that, since bend 134 of bar 132 has a transverse motion component, the rear transfer wheel 95 will remain more nearly in the plane of anyone of the sprocket 3 with which it becomes aligned during back chain transfer than in the previous embodiments.

A flexible cable actuator is used to move bar 128 back and forth in sleeve bracket 138. The front portion 136, the bend 134 and the adjacent part of rear portion 132 of bar 128 is thickened, as shown by thickened part 144, which is fixed to bar 128, or made integral therewith.

A passage 146 is made in part 144, which collaborates with bar front portion 136 to form a cable-confining passage in which extends the cable 148 which is fixed to bar 128 by screw 150. The sheath of the flexible remotely-controlled cable 148 is shown at 152 and is secured by a fastener 154, which includes an extension 156 secured to the bracket 138. Thus, cable 148 can be used in a pushing as well as in a pulling mode to effect both rearward and forward movement of bar 128 without the cable becoming bent due to the action of the confining passage 146. Therefore, the stroke of the bar 128 can be relatively long.

The combined front-and-back derailleur of FIGS. 9 to 11 can be used to obtain a smooth and progressive change in the transmission ratio of a multi-speed bicycle drive. As an example of the way to use the derailleur, reference is made to FIG. 22 wherein a group of six rear sprockets 3 is shown, denoted 1, 3, 5, 7, 9, and 11, sprocket 11 being the smallest diameter sprocket. A group of five front sprockets 5 are shown, denoted 2, 4, 6, 8, and 10. Since the rider must reverse pedalling action to effect chain transfer on the front sprockets 5, the following sequence can be easily obtained. The first speed is obtained by the chain meshing with sprockets 1 and 2. The second and third speeds are then obtained by chain transfer to back sprocket 3 and then onto back sprocket 5. The fourth speed is obtained by the chain kept meshing on back sprocket 5 and by transfer from front sprocket 2 to front sprocket 4, which is obtained by reverse pedalling.

The fifth speed is obtained by keeping the chain on front sprocket 4, which transferring the chain from back sprocket 5 to back sprocket 7. The sixth speed is obtained by keeping the chain on back sprocket 7 and transferring the chain from front sprocket 4 to front sprocket 6, while reversing pedalling motion.

The seventh speed is obtained by transferring the chain from back sprocket 7 to back sprocket 9, while keeping the chain on the front sprocket 6.

The eighth speed is obtained by transferring from front sprocket 6 to front sprocket 8, while reversing pedalling movement, the chain being kept on the back sprocket 9.

The ninth speed is obtained by transferring the chain from back sprocket 9 to back sprocket 11 and keeping the chain on the front sprocket 8.

The tenth speed is obtained by keeping the chain on the back sprocket 11 while transferring the chain from front sprocket 8 to front sprocket 10 with reverse pedalling.

FIG. 12 and 13 show another embodiment of a combined front-and-back derailleur comprising a straight bar 158, the rear end of which is suspended from bicycle frame member 15 by the positioning plate 49 and the hook 45, as in the embodiments of FIGS. 1 and 9. The same transfer wheel 153 or 95 is used together with the take-up mechanism 59 of FIG. 1, or 98 of FIG. 5. The front end of bar 158 is provided with a sleeve 160 pivoted on a downward pivot 162 fixed to one end of a transfer lever 164, having intermediate its ends a pivot pin 166. Bar 168 carries near its front end, provided with sleeve 160, a chain transfer wheel or sprocket 168 serving to transfer the chain from one front sprocket 5 to another.

Bar 158 extends along and under the bicycle frame member 15 and the chain transfer sprocket 168 is located approximately as in the embodiment of FIGS. 9 to 11 with respect to the group of front sprocket 5.

A plate 170 is secured spacedly underneath the frame plate 39 of the bicycle frame by means of four spacers 172 fixed to frame plate 39 and corresponding four screws 174. Pivot pin 166 extends through an opening 176 of plate 170 and is retained under said plate 170 by a rectangular retainer plate 178. Opening 176 is provided with three-positioning recesses 180 disposed side by side, transversely of the bicycle. The number of positioning recesses 180 corresponds to the number of front sprockets 5. The recesses 180 are formed on the front edge of the opening 176. A plate 182 fixed to pivot pin 166 is interposed between lever 164 and mounting plate 170 and is biased forwardly under the action of a tension spring 184 attached to plate 182 and to housing 7. Thus, plate 182 and spring 184 resiliently and releasably retain pivot pin 166 in any selected one of the positioning recesses 180. Two central actuator cables 186 are attached to the transfer lever 164 on either side of the pivot pin 166, as indicated by screws 188. Thus, central cables 186 control the rotation of lever 164 in both directions to effect forward and rearward movement of bar 158 for the chain transfer onto the selected rear sprockets 3. External control cables 190 are trained on pulleys 192 fixed to the underside of frame members 15 by means of posts 194 and are attached by screws 196 to the pivot-engaging plate 182. The screws 196 are disposed on either side of the pivot pin 186 to which plate 182 is fixed.

It will be seen that the portions of the actuator cables 190 which extend from pulleys 192 to the screws 196, have an inclined component such that, upon selective pulling on one external cable 190, the plate 182 will move not only rearwardly to cause pivot pin 166 to disengage the positioning recess 180, but transversely to shift the plate 182 transversely of the bicycle frame, so as to permit engagement of the pivot pin 166 into the next positioning recess 180. Thus, to effect forward chain transfer, the external cables 190 are selectively pulled. This combined front-and-back derailleur can be used for operating a ten-speed chain transmission in the manner described with the previous embodiment and in relation with FIG. 22.

Figure 14:
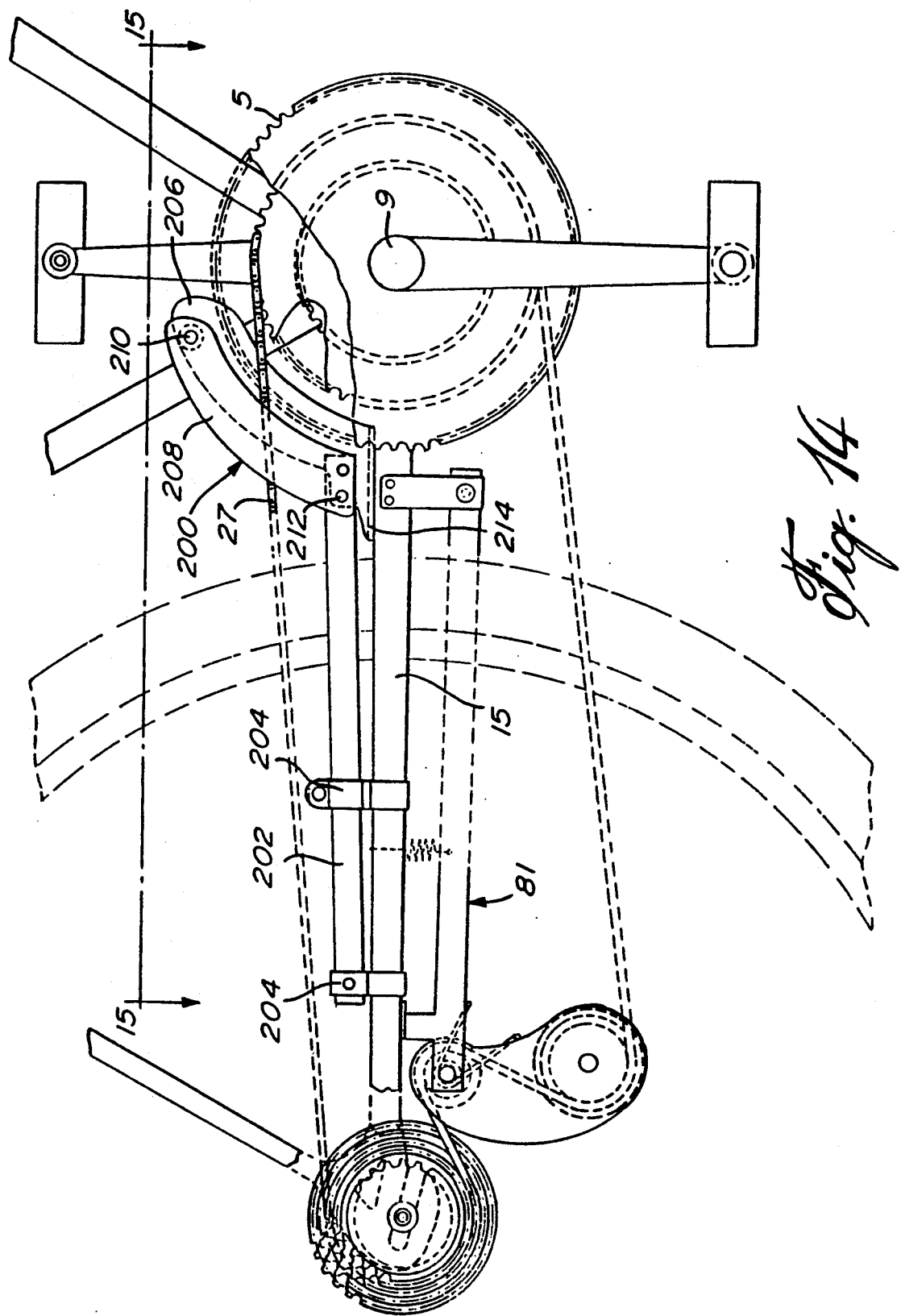
FIG. 14 is a side elevation of a bicycle fitted not only with the rear derailleur of FIG. 5, but also with a separate front derailleur.
Figure 23:
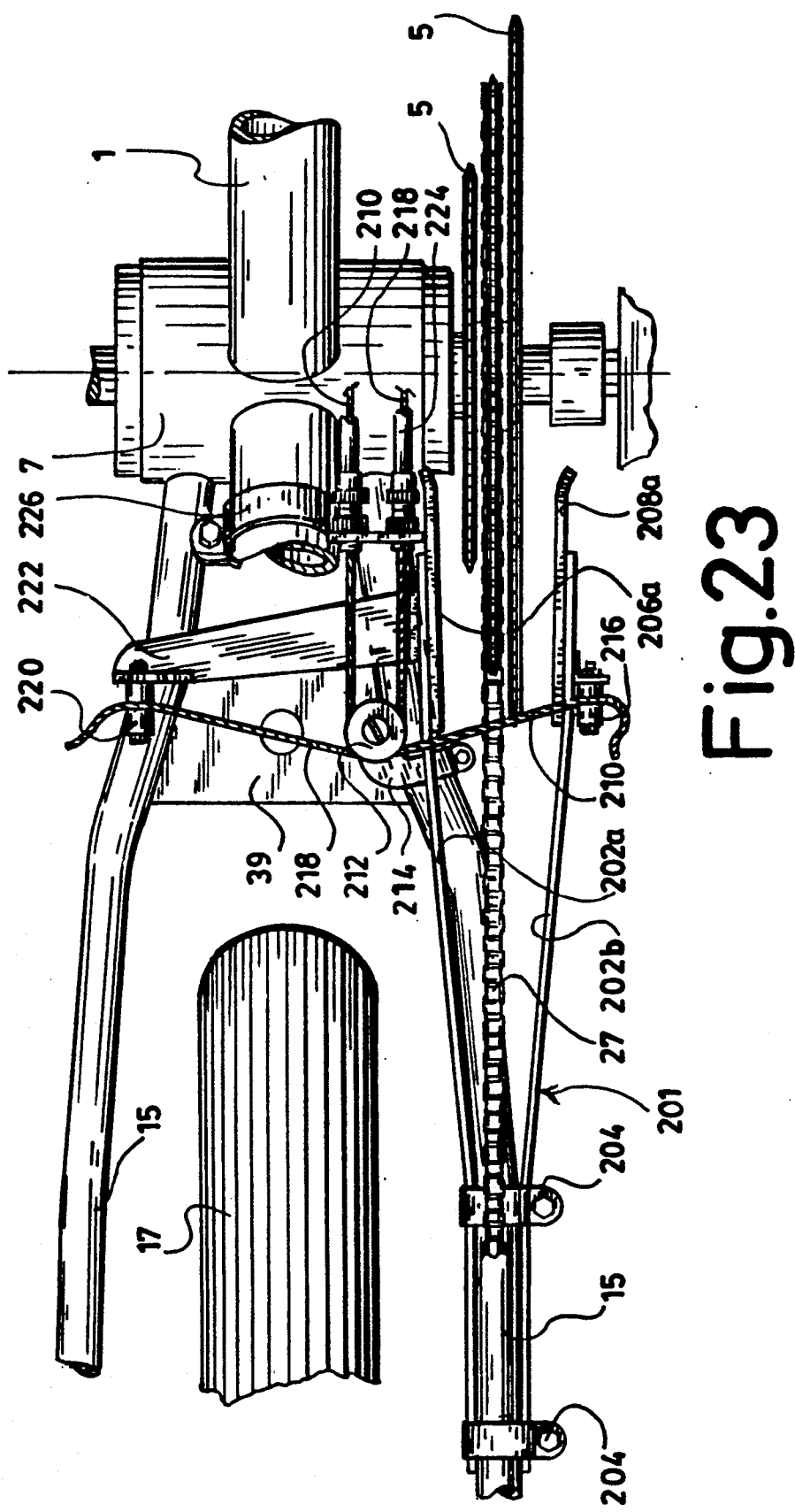
FIG. 23 is a top plan section of part of the bicycle with another embodiment of a front derailleur.

FIGS. 14 and 15 show a front derailleur, indicated at 200. The rear derailleur 81 of FIG. 5 is also shown in FIG. 14 and need not be described. Front derailleur 200 includes a torsion-resistant resilient bar 202 extending along and above the bicycle frame member 15. The rear end portion of bar 202 is rigidly secured to frame member 15 by two spaced brackets 204. The front end of bar 202 carries a pair of curved driving chain-contacting and transfer plates 206, 208 fixed together in spaced parallel relationship by a front spacer 210 and a rear spacer 212.

Inside plate 206 is radially nearer the crank axle 9 than the outside plate 208 as is conventional. Lateral shifting the front end of bar 202 causes either one of the inside or outside plates 206, 208 to engage the chain 27 extending therebetween and transfer the chain from one sprocket 5 to another desired one. Preferably, the front end of bar 202 also carries a laterally-extending rest-plate 214 slidably bearing on one or two frame members 15. A flexible actuator cable 216 is attached to rest-plate 214, while its flexible sheath 218 is fixed to the bicycle frame. Cable 216 can be of the type exerting a push force as well as a pull force.

FIG. 25 shows another improved front derailleur 201. This derailleur has the same shape when seen in side elevation as that of FIG. 14. Two bars 202A instead of one bar 202 are fixed to the bicycle frame member 15 by brackets 204 and the front end of each bar carries a driving chain-contacting and transferring plate, namely an inside plate 206A and an outside plate 208A.

It is noted that the arrangement of the inside plate 206A, with its supporting bar 202A, is completely independent from the arrangement of the outside plate 208A, with its supporting bar 202B. Thus, the two transfer plates can be laterally shifted with respect to the front sprockets 5 independently of each other.

The two bars 202A, 202B are flexible and resilient and are arranged that in their unstressed position, the transfer plates 206A, 208A are positioned laterally inside and outside respectively of the group of front sprockets 5, as clearly shown in FIG. 25. A first control cable 210 is trained on a pulley 212 mounted by bracket 214 on the bicycle frame and is attached to bar 202B by a fastener 216.

A second control pull-cable 218 is trained on another co-axial pulley 212 and is attached by a screw 220 to the outer end of a laterally-extending arm 222 fixed to the other bar 202A. The sheaths 224 of the two flexible remotely-controlled cables 210 and 218 are fixed to the bicycle frame as per a bracket 226.

The front derailleur 201 of FIG. 25 is designed to overcome the following disadvantages of the front derailleur 200 of FIGS. 14 and 15 and of other conventional front derailleurs in which the two transfer plates 202 are fixed together at a constant distance and located on each side of the driving chain 27.

It is known that for transfer of the driving chain from one front sprocket to the other, it is always necessary to move the transfer plate contacting the chain well passed the plane of the sprocket on which the chain is to be trained. Therefore, the derailleur assembly must be moved back to a centered position with respect to the claim after chain transfer, in order to avoid frictional contact between either one of the plates and the chain itself. This needs adjustment of the remote control system and it frequently happens that the system becomes maladjusted. With the front derailleur 201 of FIG. 25, both transfer plates 206a and 208a are in their rest-position, completely outside of the group of sprockets and cannot therefore come in frictional contact with the driving chain. Frictional contact is only effected during chain transfer, using either one of the two chain transfer plates.

Referring to FIGS. 16 and 17, there is shown a combined chain guide and sprocket protector for the largest diameter front sprocket 5A of a multi-speed bicycle. This device is generally shown at 228 and comprises a ring 230 reinforced by radial ribs 232 and fixed co-axially with and to the sprocket 5A at the outside face thereof by means of rivets 232. The ring 230 protrudes radially outwardly from the sprocket teeth 234 and its side face 236 is kept spaced from the sprocket 5A a distance just sufficient to clear the chain links of the roller chain used as a driving chain 27 in bicycles. The spacing just described is obtained by the radially-inner thicker portion 238 of the ring 230, which portion directly contacts sprocket 5a. A rim 240, made of vulcanized rubber of the like material which is softer and more impact-absorbing than the synthetic resin constituting the ring 230, is fitted around a cylindrical flange 242 of ring 230 by means of a dovetailed connection 244.

Ring 230 and rim 240 effectively absorb impacts when coming in contact with a rough terrain, for instance when the system is mounted on a mountain bicycle. A ring 230 without rim 240 is also preferably secured to the smallest diameter front sprocket to prevent chain 27 from falling between said sprocket and the bicycle frame.

FIGS. 18 and 19 show an improved part of a combined chain transfer and take-up device, which can be used in conventional derailleurs and also to replace the similar systems illustrated hereinbefore, except the take-up device shown in FIGS. 1 to 5. The combined chain transfer and take-up device 246 is molded in plastic in one piece and includes a pair of spaced levers 248 integrally interconnected by a chain transfer cylindrical spacer 250 and a chain take-up cylindrical spacer 252. Spacer 250 may have a smaller diameter than spacer 252. Each spacer is provided at its cylindrical periphery with a peripheral groove defined by a cylindrical bottom wall 254 and radial side walls 256 facing each other. A central rib 258 radially protrudes outwardly from bottom wall 254 a sufficient distance to contact the rollers 260 of a roller type drive chain 27, so as to maintain the chain links 262 out of contact with the bottom wall 254. The distance separating the two side walls 256 is just sufficient to clear the chain links 262. Thus, there is no friction due to the slidable movement between the parts, since the rollers 260 simply roll on the central rib 58. Also, the chain is positively guided on and around the device.

FIGS. 20 and 21 show a similar arrangement, except that rotatable sprockets are used. The device 246a comprises a pair of spaced parallel levers 248A interconnected by shafts 264. The top shaft carries a chain transfer sprocket 258, while the bottom shaft carries a chain take-up sprocket 268, both through the intermediary of needle bearings 270.

Here again, the body of each sprocket 266 and 268 is provided at its periphery with a groove defined by opposite side walls 272 and a bottom walls 274, from the center of which radially outwardly protrudes a rib 276 formed with a series of notchers 278 defining sprocket teeth therebetween. The bottom of these notches 278 is sufficiently raised from the bottom wall 274 to keep the chain links 262 raised off the bottom wall 274 when the rollers 260 are supported by the bottom of the notches 278. FIG. 24 shows a groups of rear sprockets 3 for a multi-speed bicycle with a driving chain guard 280 directly fixed to the largest diameter sprocket 3 on the outside of the sprocket set and rotating therewith. The chain guard 280 is of annular shape and is provided with a circular rib 282 to maintain the peripheral portion of the annular guard 280 a distance just sufficient to clear the side of the driving chain. The guard 280 protrudes radially outwardly form the adjacent sprocket. Thus, a chain trained on this sprocket cannot jump off the sprocket and becomes lodged between the wheel and this sprocket. In a similar manner, a second guard 284, provided with a rib 286 and of annular shape, is directly fixed to the rear wheel shaft 21 adjacent the smallest diameter sprocket 3 and on the outside of the group of sprockets. The guard 284 has a greater diameter than the smallest sprocket 3 and the rib 286, which is arranged just not to touch the adjacent rotating sprocket, maintains just a sufficient distance for the free passage of the chain links of the chain trained on this adjacent sprocket. Here again, the chain is positively retained on the sprocket.

I claim:

1. A derailleur for a multi-speed bicycle having a bicycle frame including a rear-wheel supporting frame member rearwardly extending from a pedalling axle supporting housing, a plurality of rear sprocket and a drive chain, said derailleur comprising a torsion-resistant bar extending, when installed, below and generally along said frame member and having a bar front end and a bar rear end, a mounting means adapted to be secured to said bicycle frame adjacent said housing and holding said bar front end and preventing said bar from rotating about its longitudinal axis, said bar rear end located adjacent said drive sprocket and movable transversely of said frame member, a drive chain transfer means carried by said bar rear end and engaging said drive chain and shifting means for shifting said bar rear end transversely of said frame member to align said transfer means with any selected rear drive sprocket an elongated member supported by and extending alongside said bar, means to guide said elongated member for longitudinal movement relative to said bar, a chain-engaging take-up member carried by the rear end of said elongated member, and first biasing means biasing said elongated member rearwardly with respect to said bar to cause said chain take-up member to eliminate slack in said chain, said first biasing means including an elastic, flexible cord having one end secured to said bar front end and its other end secured relative to the front end of said elongated member and a return pulley carried by said bar intermediate said bar front and rear ends and on which said elastic cord is trained.

2. A derailleur as defined in claim 1, wherein said mounting means also allows up-and-down movement of said bar rear end relative to said frame member, said mounting means preventing said bar from pivoting transversely of said frame member, said bar being resilient and flexible, so that its rear end can move transversely of said frame member, second biasing means connected to said frame member and to said bar and urging said bar upwardly towards said frame member and an abutment carried by one of said bar and frame member and slidably abutting against the other one of said bar and frame member and said shifting means include remotely-controlled actuator means acting on and transversely of said bar rear end.

3. A derailleur as defined in claim 1, wherein said elongated member includes a pair of elongated plates extending on each side of said bar and spacer members interconnecting said plates above and below said bar.

4. A derailleur as defined in claim 3, wherein said spacer members allow up-and-down movement of the rear ends of said elongated plates as well as longitudinal movement of said elongated plates relative to said bar.

5. A derailleur as defined in claim 4, wherein said spacer members include a first spacer member fixed to an intermediate portion of said elongated plates above said bar and a second spacer member fixed to the front portion of said elongated plates underneath said bar, said two spacer members holding said elongated plates in a rearwardly-downwardly-inclined limit position by contacting the upper and lower edges, respectively, of said bar.

6. A derailleur as defined in claim 5, further including a finger longitudinally extending between said elongated plates above said bar and having a finger rear end pivoted to said elongated plates for up-and-down movement, said finger having a finger front end to which said other end of said elastic cord is attached.

7. A derailleur as defined in claim 6, wherein said bar has a downwardly-protruding boss along its intermediate portion of its lower edge, said second spacer member engageable with said boss in the rearmost position of said elongated plates with respect to said bar to raise the rear ends of said plates.

8. A derailleur for a multi-speed bicycle having a bicycle frame including a rear wheel supporting frame member rearwardly extending from a pedalling axle supporting housing, a plurality of rear sprockets and a drive chain, said derailleur comprising a torsion-resistant bar extending, when installed, below and generally along said frame member and having a bar front end and a bar rear end, a mounting means adapted to be secured to said bicycle frame adjacent said housing and holding said bar front end and preventing said bar from rotating about its longitudinal axis, said bar rear end located adjacent said drives sprockets and movable transversely of said frame member, a drive chain transfer means carried by said bar rear end and engaging said drive chain and shifting means for shifting said bar rear end transversely of said frame member to align said transfer means within a selected rear drive sprocket, wherein said shifting means include an upstanding hook fixed to said bar rear end, a positioning plate secured to said frame member under the same, said positioning plate having an upper surface provided with a series of recesses disposed transversely of said frame member, said hook selectively engageable within any one of said recesses to suspend said bar rear end with said drive chain transfer means in alignment with any selected rear drive sprocket.

9. A derailleur as defined in claim 8, further including an elongated member supported by and extending alongside said bar, means to guide said elongated member for longitudinal movement relative to said bar, chain-engaging take-up member carried by the rear end of said elongated member, first biasing means biasing said elongated member rearwardly with respect to said bar to cause said chain take-up member eliminate slack in said chain.

10. A derailleur as defined in claim 8, wherein said mounting means allows said bar to move longitudinally, forwardly and rearwardly with respect to said frame member, said shifting means including remotely-controlled actuator means acting on said bar to selectively move the same longitudinally, forwardly or rearwardly, and further including a slot made in said positioning plate through which said upstanding hook extends and is retrained against movement other than guided movement along said slot, said slot inclined with respect to said frame member and substantially parallel to the envelope of said drive sprockets.

11. A derailleur as defined in claim 10, wherein said mounting means includes a lever pivoted to said bicycle frame and extending transversely of said frame member, the bar front end being pivotally connected to one end of said lever, said actuator means acting on said lever to pivot the same, so as to move said bar rearwardly and forwardly.

12. A derailleur as defined in claim 9, wherein said mounting means allows said bar to move longitudinally, forwardly and rearwardly with respect to said frame member, said shifting means including remote-controlled actuator means acting on said bar to selectively move the same longitudinally, forwardly or rearwardly; and further including a slot made in said positioning plate through which said upstanding hook extends and is restrained against movement other than guided movement along said slot, said slot inclined with respect to said frame member and substantially parallel to the envelope of said drive sprockets.

13. A derailleur as defined in claim 12, wherein said mounting means includes a lever pivoted to said bicycle frame and extending transversely of said frame member, the bar front end being pivotally connected to one end of said lever, said actuator means acting on said lever to pivot the same, so as to move said bar rearwardly and forwardly.

14. A derailleur as defined in claim 13, wherein said lever is pivoted intermediate its ends and said actuator means includes a pair of pull-cables attached to the opposite ends of said lever to alternately pivot the same in one or the other direction of rotation.

15. A derailleur for a multi-speed bicycle having a bicycle frame including a rear wheel supporting frame member rearwardly extending from a pedalling axle supporting housing, a plurality of rear sprockets and a drive chain, said derailleur comprising a torsion-resistant bar extending, when installed, below and generally along said frame member, and having a bar front end and a bar rear end, a mounting means adapted to be secured to said bicycle frame adjacent said housing and holding said bar front end and preventing said bar from rotating about its longitudinal axis, said bar rear end located adjacent said drive sprockets and movable transversely of said frame member, a drive chain transfer means carried by said bar rear end and engaging said drive chain and shifting means for shifting said bar rear end transversely of said frame member to align said transfer means with any selected rear drive sprocket, said multi-speed bicycle further having a pedal axle and a plurality of front drive sprockets mounted on said pedal axle, said derailleur further including a second transfer means carried by said bar adjacent said bar front end and over which the strand of said drive chain issuing from a front drive sprocket is trained, and further including means to selectively, laterally shift the portion of said bar carrying the second transfer means, so as to cause the latter to transfer said strand of said drive chain from one front drive sprocket to another when said front drive sprockets are rotated in a direction reverse to the direction causing forward movement of the bicycle.

16. A derailleur as claimed in claim 15, wherein said fastener is pivoted to said bicycle frame rearwardly of and adjacent said housing, and includes a sleeve in which the front end of said bar is slidably mounted, said bar having a bend and including a major straight rear portion and a shorter front portion inclined with respect to said rear portion at said bend, said front portion slidable within said sleeve, said remotely controlled actuator exerting a forward and a rearward displacement of said bar and, consequently, lateral displacement of the front part of said rear portion, said second chain transfer means being mounted on said bar adjacent said bend; and further including means to laterally displace said rear end of said bar upon longitudinal movement of said bar.

17. A derailleur as defined in claim 16, wherein said remotely controlled actuator includes a flexible cable and a flexible sheath therefor, a bracket secured to said fastener; means to secure said sheath to said bracket forwardly of said bar, said bracket including a cable-confining passage in which the portion of said control cable issuing form said sheath is confined; the free end of said cable being attached to said bar, whereby pulling of said cable will pull said bar forwardly and pushing action exerted on said cable will push said bar rearwardly, while the exposed portion of said cable is prevented from bending, being confined in said cable confining passage.

18. A derailleur as defined in claim 17, wherein said shifting means for shifting said bear rear end includes a plate suspended from said frame member adjacent said rear sprockets and having a slot extending substantially parallel to the envelope of said rear sprockets, said plate having an upper face provided with a plurality of positioning recesses; a hook member secured to and upstanding from the rear end of said bar, extending through said slot and selectively engageable with any one of said recesses upon longitudinal movement of said bar, so as to position said rear drive chain transfer means in alignment with a selected one of said rear sprockets.

19. A derailleur as defined in claim 15, wherein said bar is straight from end to end; and wherein said fastener includes a lever transversely extending of said bicycle frame adjacent to and rearwardly of said drive sprocket; said lever having a pivot pin intermediate its ends, one end of said lever pivotally connected to the front end of said bar; remote controlled actuator means for pivoting said transverse lever in either direction of rotation; and further carrying a plate secured to said bicycle frame and including a plurality of positioning recesses extending side by side transversely of said bicycle frame; biasing means to cause said pivot pin to selectively engage with either one of said recesses; and additional remotely controlled actuator means selectively exerting a pull on said pivot pin against the action of said biasing means and having a transverse pull component to shift said pivot pin into any selected one of said positioning recesses.

20. A front derailleur for a multi-speed bicycle having a bicycle frame including a rear wheel-supporting frame member rearwardly extending from a pedalling axle-supporting housing, a pedalling axle, a plurality of front sprockets fixed to said axle and a drive chain; said front derailleur comprising a torsion-resistant bar extending above and generally along said frame member and having a front end and a rear end; fastener means carried by said bicycle frame member substantially intermediate the length of the same and holding a rear end portion of said bar and preventing said bar from moving up and down and from rotating about its longitudinal axis; a rest plate carried by the front end of said bar and resting on said frame member, and a pair of curved drive chain transfer plates extending on both sides of said drive chain above said frame member; and actuator means for shifting the bar front end transversely of said frame member to cause either one of said transfer plates to engage and transversely shift said drive chain from one front sprocket to another.

21. A front derailleur as defined in claim 20, wherein said actuator means include a flexible actuator cable and a sheath therefor, said sheath fixed to said bicycle frame, said cable fixed to said rest plate.

22. A front derailleur for a multi-speed bicycle having a bicycle frame, a pedalling axle, a plurality of front sprockets secured to said pedalling axle and a drive chain, comprising a pair of drive chain transfer plates in transverse register with said drive chain above and rearwardly of said driving axle, one of the two transfer plates located on one side and the other one on the opposite side of said drive chain, mounting means independently mounting each transfer plate on said bicycle frame for selective and independent shifting movement transversely of said front sprockets, biasing means normally biasing said drive chain transfer plates in a direction away from each other to rest positions laterally outside of the outermost sprockets of said plurality of front sprockets and shifting means for each transfer plate for selectively shifting the same, each shifting means, when operated, exerting a force on its associated drive chain transfer plate against the action of said biasing means to cause said associated drive chain transfer plate to contact and transfer said drive chain from one front sprocket to another, while the other drive chain transfer plate, the shifting means of which is not operated, remains in its rest position.

23. A front derailleur as claimed in claim 22, wherein said bicycle has a rear wheel-supporting frame member rearwardly extending from the housing supporting said pedalling axle and said mounting means include a pair of torsion-resistant bars extending above and generally along said frame member, and having a front end and a rear end, fastener means carried by said bicycle frame member substantially intermediate the length of the same and holding a rear end portion of each of said bars and preventing said bars from moving up and down and from rotating about their longitudinal axes, each bar carrying at its front end one of said drive chain transfer plates, the two transfer plates extending above said frame member.

24. A front derailleur as claimed in claim 23, wherein each bar is resiliently flexible and constitutes said biasing means.

25. A derailleur for a multi-speed bicycle, having a bicycle frame including a rear wheel supporting frame member rearwardly extending from a pedalling axle supporting housing, a plurality of rear sprockets and a drive chain, said derailleur comprising a torsion-resistant bar extending, when installed, below and generally along said frame member and having a bar front end and a bar rear end, a mounting means adapted to be secured to said bicycle frame adjacent said housing and holding said bar front end and preventing said bar from rotating about its longitudinal axis, said bar rear end located adjacent said drive sprockets and movable transversely of said frame member, a drive chain transfer means carried by said bar rear end and engaging said drive chain and shifting means for shifting said bar rear end transversely of said frame member to align said transfer means with any selected rear drive sprocket, said mounting means including a sleeve fixed to said bicycle frame and in which the front end of said bar is slidably mounted, said bar having a bend and including a major straight rear portion and a shorter front portion inclined with respect to said rear portion at said bend, said front portion slidable within said sleeve and remotely-controlled actuator means exerting a forward and a rearward displacement of said bar and, consequently, lateral displacement of the front part of said rear portion, so as to maintain said rear portion of said bar substantially parallel to itself while moving transversely of said frame member.

26. A derailleur as defined in claim 25, wherein said shifting means for shifting said bar rear end includes a plate suspended from said frame member adjacent said rear sprockets and having a slot extending substantially parallel to the envelope of said rear sprockets, said plate having an upper face provided with a plurality of positioning recesses disposed side by side along an edge of said slot; a hook member secured to and upstanding from the rear end of said bar, extending through said slot and selectively engageable with any one of said recesses upon longitudinal movement of said bar, so as to position said rear drive chain transfer means in alignment with a selected one of said rear sprockets.

27. A derailleur as defined in claim 25, wherein said drive chain transfer means is a transfer idle wheel and further including an elongated member supported by and extending alongside said bar, means to guide said elongated member for longitudinal movement relative to said bar rear portion, a chain-engaging idle wheel carried by the rear end of said elongated member and biasing means biasing said elongated member rearwardly with respect to said bar to cause said take-up idle wheel to eliminate slack in said chain.

28. A derailleur as defined in claim 27, wherein said biasing means includes an elastic flexible cord having one end secured to the front end of said bar, and its other end secured relative to the front end of said elongated member, and a return pulley carried by said bar intermediate its ends and on which said elastic flexible cord is trained.

29. A derailleur for a multi-speed bicycle having a bicycle frame including a rear wheel-supporting frame member rearwardly extending from a pedalling axle supporting housing, a plurality of rear sprockets and a drive chain, said derailleur comprising a torsion-resistant bar extending, when installed, below and generally along said frame member and having a bar front end and a bar rear end, a mounting means adapted to be secured to said bicycle frame adjacent said housing and holding said bar front end and preventing said bar from rotating about its longitudinal axis, said bar rear end located adjacent said drive sprockets and movable transversely of said frame member, a drive chain transfer means carried by said bar rear end and engaging said drive chain and shifting means for shifting said bar rear end transversely of said frame member to align said transfer means with any selected rear drive sprocket, said drive chain transfer means being an idle transfer wheel, an elongated member supported by and extending alongside said bar, means to guide said elongated member for longitudinal movement relative to said bar, a chain-engaging idle take-up wheel carried by the rear end of said elongated member, and biasing means biasing said elongated member rearwardly with respect to said bar to cause said idle take-up wheel to eliminate slack in said chain.

* * * * *